United States Patent
Adam et al.

(10) Patent No.: US 6,375,839 B1
(45) Date of Patent: Apr. 23, 2002

(54) PROCESS AND DEVICE FOR SEPARATION WITH VARIABLE-LENGTH CHROMATOGRAPHIC ZONES

(75) Inventors: Phillippe Adam, Maxeville; Roger Marc Nicoud, Richardmesnil; Michel Bailly; Olivier Ludemann-Hombourger, both of Nancy, all of (FR)

(73) Assignees: Institut Francais du Petrole, Rueil Malmaison; Novasep, Vandeouvre les Nancy Cedex, both of (FR)

( * ) Notice: Subject to any disclaimer, the term of this patent is extended or adjusted under 35 U.S.C. 154(b) by 0 days.

(21) Appl. No.: 09/484,027

(22) Filed: Jan. 18, 2000

Related U.S. Application Data

(60) Division of application No. 09/208,765, filed on Dec. 10, 1998, now Pat. No. 6,136,198, and a continuation of application No. PCT/FR99/02653, filed on Oct. 29, 1998.

(30) Foreign Application Priority Data

Oct. 29, 1998 (FR) .............................. 98 13600

(51) Int. Cl.$^7$ ............................................... B01D 15/08
(52) U.S. Cl. ................................... 210/198.2; 210/659
(58) Field of Search ................................ 210/635, 656, 210/659, 662, 672, 198.2

(56) References Cited

U.S. PATENT DOCUMENTS

| | | |
|---|---|---|
| 4,498,991 A | 2/1985 | Oroskar ....................... 210/659 |
| 5,093,004 A | 3/1992 | Hotier ......................... 210/659 |
| 5,578,215 A | 11/1996 | Hotier et al. ............... 210/659 |
| 6,136,198 A * | 10/2000 | Adam .......................... 210/659 |

FOREIGN PATENT DOCUMENTS

| | | | |
|---|---|---|---|
| FR | 2721528 | 12/1995 | ................. 210/659 |
| FR | 2754730 | 10/1996 | ................. 210/659 |

OTHER PUBLICATIONS

Nicoud et al., "Choice and Optimization of Operating Mode in Industrial Chromatography", Proceedings of the 9th International Symposium on Preparative and Industrial Chromatography PREP '92—Apr. 1992—Nancy. pp. 205–221.

Charton et al., "Complete design of a simulated moving bed", J. Chromatogr. A 702, (1995) pp. 97–112.

* cited by examiner

*Primary Examiner*—Ernest G. Therkorn
(74) *Attorney, Agent, or Firm*—Millen, White, Zelano & Branigan, P.C.

(57) ABSTRACT

A process for separating at least one component of a mixture in a set of closed-loop chromatographic columns is described, whereby the loop comprises at least one feedstock injection point, a raffinate draw-off point, an eluant injection point, and an extract draw-off point, in which a determination is made between an injection point and a draw-off point or vice-versa a chromatographic zone, and at the end of a given period of time, all of the injection points and draw-off points are shifted by the same number of columns or column sections and advantageously by one column or column section in a given direction that is defined relative to that of the flow of a main fluid that circulates through the loop. During the period, the shifting of different injection points and draw-off points of at least one column or column section is done at different times in such a way that the lengths of the zones that are defined by said different points are variable. The process is useful for the separation particularly of stereoisomers for pharmaceuticals.

14 Claims, No Drawings

PROCESS AND DEVICE FOR SEPARATION WITH VARIABLE-LENGTH CHROMATOGRAPHIC ZONES

This application is a division of the U.S. application Ser. No. 09/208,765, filed Dec. 10, 1998 now U.S. Pat. No. 6,136,198, and a continuation of PCT application No. FR99/02653, filed Oct. 29, 1998.

SUMMARY OF THE INVENTION

The invention relates to a process and a device for separating at least one component of a mixture by contact between liquid and solid phases in variable-length chromatographic zones.

It applies to chiral separations and in particular to the separation of stereoisomers that are used especially in the field of pharmaceutics.

There are different chromatographic processes that can be used for the production of chemical components on a large scale.

The publication by R. M. NICOUD and M. BAILLY (Choice and Optimization of Operating Mode in Industrial Chromatography, Proceeding of the 9th International Symposium on Preparative and Industrial Chromatography, PREP 92, April 1992, Nancy, pp. 205–220) illustrates this technological background.

These processes can be classified according to several criteria: the process can be either discontinuous or continuous, the composition of the eluent can be isocratic, or a composition gradient can be carried out.

One of these possibilities is the true standard moving-bed 4-zone countercurrent process where in a moving-bed system, with a view to producing a continuous countercurrent effect, solids circulate continuously in a closed loop past the fixed feedstock and eluant introduction points alternately with draw-off points for a raffinate and an extract.

Since this process is perfectly well known and described, only the characteristics that are required to understand the nature of this invention are summarized below. For the operating mode in a True Moving Bed, countercurrent contact between the liquid and solid phases is made in the column, which can be divided into four different zones.

Zone I: Everything that is located between the eluant injection lines and the extract draw-off lines Zone II: Everything that is located between the extract draw-off lines and the feedstock injection lines Zone III: Everything that is located between the feedstock injection lines and the raffinate draw-off lines Zone IV: Everything that is located between the raffinate draw-off lines and the eluant injection lines.

Because of the inlet/outlet flow rates, the liquid flow rate varies according to the zone, whereby $Q_I$, $Q_{II}$, $Q_{III}$, and $Q_{IV}$ are the respective flow rates in zones I, II, III, and IV.

In 1961, the UOP Company patented a process that makes it possible to simulate the movement of the solid by an elegant connection between the columns that are interconnected in a closed loop (U.S. Pat. No. 2,985,589 and U.S. Pat. Nos. 3,291,726, 3,268,605). This process, called a Simulated Moving Bed (LMS), then makes it possible to produce the True Moving Bed in practice in a simple way. Said process is characterized in that the feedstock and eluant introduction points are periodically advanced downstream (in the direction of circulation of the main fluid), while the draw-off points for a raffinate and an extract are advanced simultaneously by one column or column section.

All of the inlet and outlet lines are therefore moved simultaneously with each period $\Delta T$ and cycle time, at the end of which time they find that their initial position is equal to Nc x $\Delta T$, whereby Nc is the total number of columns.

The prior art is also illustrated by the patent application of the applicant, FR-A-2 754 730, and by U.S. Pat. No. 4,498,991.

This process has been extensively described particularly by CHARTON and NICOUD (Complete Design of a Simulated Moving Bed, Journal of Chromatography 1995, 702, 97–102).

Only the minimum information that is necessary for good comprehension of this invention will be recapped below.

The inlet/outlet positions are moved simultaneously at fixed intervals. It is advised that the position of the line be marked by line (n), which indicates that at a given moment, a given inlet/outlet line is connected to the inlet of column n. For example, in a 12-column system, feedstock (9) means that the feedstock line is connected to the inlet of column 9, whereas raffinate (11) means that the raffinate line is connected to the inlet of column 11.

By using this definition, a system can be represented by: El(3)/Ext(6)/Peedstock(9)/Raff(11). For this configuration, the numbers of columns in zones 1, II, III, and IV are respectively: 3/3/2/4. The configuration of the system is then completely defined by:

Inlet/Outlet             No. of Columns

At time 0: El(3)/Ext(6)/Feedstock(9)/Raff(11) 3/3/2/4

After a given time (the PERIOD), all of the inlet/outlet positions are moved simultaneously by one column, and the system is described as follows:

At time $\Delta T$: El(4)/Ext(7)/Feedstock(10)/Raff(12) 3/3/2/4

After a new period, all of the positions will again be moved simultaneously by one column, and the system will then be described as follows:

At time 2×$\Delta T$: El(5)/Ext(8)/Feedstock(11)/Raff(1) 3/3/2/4

At time 2×$\Delta T$, the position of the raffinate has been moved from position 12 to position 1. Notice that position 1 can be written as position 13 modulo 12. ($[13]_{12}$).

This presentation can be generalized to simulated moving beds that comprise a number of columns Nc. For a simulated moving bed that consists of Nc columns, it is obvious that no position can exceed Nc. For the sake of simplicity, we will simply increase all of the positions by one unit with each movement, and we will define all of the modulo Nc positions (for example, $[8]_{Nc}=3$ if Nc=5).

If, at a given moment, the configuration of the simulated moving bed is El(e)/Ext(x)/Feedstock(f)/Raff(r), simple reasoning makes it possible to find the number of columns that are contained in each zone:

Zone 1: $Nb1=[x-e]_{Nc}$; Zone 2: $Nb2=[f-x]_{Nc}$

Zone 3: $Nb3=[r-f]_{Nc}$; Zone 4: $Nb4=[e-r]_{Nc}$

It is possible to verify simply that: Nb1+Nb2+Nb3+Nb4= Nc and the system is completely defined by Table 1.

TABLE 1

|  | Inlet/Outlet | No. of Columns in Each Zone |
|---|---|---|
| At time 0: | E1(e)/Ext(x)/Feed(f)/Raff(r) | Nb1/Nb2/Nb3/Nb4 |
| At time $\Delta T$: | E1($[e + 1]_{Nc}$)/Ext($[x + 1]_{Nc}$)/Feed($[f + 1]_{Nc}$)/Raff($[r + 1]_{Nc}$) | Nb1/Nb2/Nb3/Nb4 |
| At time n × $\Delta T$: | E1($[e + n]_{Nc}$)/Ext($[x + n]_{Nc}$)/Feed ($[f + n]_{Nc}$)/Raff($[r + n]_{Nc}$) | Nb1/Nb2/Nb3/Nb4 |

The injection points and draw-off points are shifted by one column after a period $\Delta T$ and by Nc columns after Nc periods. The number of columns in each zone remains unchanged. The injection points and draw-off points therefore regain their initial positions after cycle time Nc×ΔT.

The main characteristics of the simulated moving bed systems (providing a practical implementation of the true moving bed) are defined by:

1. Zones that are defined by the positions of the inlet/outlet lines,
2. A set number of columns per zone, constant over time,
3. Zones of fixed length that are constant over time,
4. Synchronized movement of all of the inlet/outlet lines.

Characteristics 2, 3, and 4 are due to the fact that the simulated moving bed simulates the behavior of the true moving bed.

According to Patent FR. 2 721 528, it is possible to correct the composition disturbances of the extract and the raffinate that are caused by the dead volume of the recycling pump that is located between the last and first beds of the adsorption column by increasing by a suitable value the period of connection of a fluid injection flow or draw-off in the system each time that this flow passes from one position that is immediately in front to a position that is immediately behind the dead volume, and then by reducing said connection period when this flow moves from the position that is immediately behind the dead volume to the next position. Once per cycle, however, all of the inlets and outlets are shifted simultaneously. This technique makes it possible to compensate for the technological imperfections in a simple way in order to make it operate in a way that is close to that of an ideal simulated moving bed.

In the processes for separation in a simulated moving bed that use a small number of columns, it most often seems that the products that are recovered in the extract and in the raffinate exhibit different purities, excellent for one of the two but inadequate for the other. In some types of separation, when the adsorbent volume that is used is small, the levels of purity of the extract and the raffinate can even turn out to be inadequate, as can be seen in the examples.

One of the objects of the invention is to eliminate these drawbacks.

Another object is therefore to increase the purity of the product that is drawn off as an extract and as a raffinate.

Another object is to minimize the costs of the separation.

It was thus noted that by not simultaneously moving the positions of the inlets and the outlets of fluid during the period and during the cycle time, it was possible to obtain improved results.

More specifically, the invention relates to a separation process that is called VARICOL of at least one component of a mixture that contains it, in a device that has a set of chromatographic columns or chromatographic column sections that contain an adsorbent and are arranged in series and in a closed loop, whereby the loop comprises at least one feedstock injection point, a raffinate draw-off point, an eluant injection point, and an extract draw-off point, in which a chromatographic zone is determined between an injection point and a draw-off point or vice-versa, whereby the process is characterized in that at the end of a given period of time, all of the injection points and draw-off points are shifted by the same number of columns or column sections, advantageously by one column or column section in a given direction that is defined relative to that of the flow of a main fluid that circulates through the loop, and in that during said period, the shifting of different injection points and draw-off points is carried out at different times such that the lengths of the zones that are defined by said different points are variable.

The period is defined as the smallest time interval ΔT at the end of which each of the inlets and outlets has been shifted by the same number of columns or column sections, advantageously by one column or column section, whereby the shifting has not taken place simultaneously for all of the inlets and outlets.

It should be noted that at the end of a cycle time, the system has regained its initial position. When the shifting is a column or a column section per period, the cycle time is equal to Nc×ΔT.

The term adsorbent is used in its most general sense. It can be an adsorbent such as a molecular sieve, a zeolitic sieve, for example, that is used in the adsorption processes, or an adsorbent such as an ion-exchange resin. It may also be a stationary phase on a silica base, an inverse-phase adsorbent, and a chiral phase.

In a more detailed manner, it is possible to produce at least once the succession of following stages:

At moment t1 during said period, in a given direction, the position of the injection point or draw-off point is shifted relative to at least one zone by a column or column section, then at a moment t2 during said period, the position of an injection or draw-off point that is relative to at least one other zone is shifted in the same direction by a column or column section, and the operation is repeated if necessary such that after said time period, the same column configuration or column section configuration as the initial configuration is regained with a shifting of all of the positions of the injection points and draw-off points of the same number of columns or column sections, and advantageously a column or a column section.

According to another embodiment, it is possible to produce at least once the succession of following stages:

At moment t1 during said period ΔT, in a given direction, the position of the injection point or draw-off point is shifted relative to at least one zone by a column or column section, in such a way as to increase the length of said zone and to reduce the length of the zone that is adjacent to said zone, then at a moment t2 during said period, the position of the injection point or draw-off point that is relative to at least one other zone is shifted in the same direction by a column or column section in such a way as to increase the length of said other zone and to reduce the length of the zone that is adjacent to said other zone, and the operation is repeated if necessary such that after said time period ΔT, the same column configuration as the initial configuration is regained with a shifting of all of the positions of the injection points and draw-off points of the same number of columns or column sections and advantageously a column or a column section.

According to a first implementation that is illustrated by Table 2, it is possible to continually vary the lengths of zones of a column, whereby the increase of one zone is compensated for by the reduction of the next zone.

TABLE 2

|  | Inlet/Outlet | No. of Columns in Each Zone |
| --- | --- | --- |
| At time 0: | E1(e)/Ext(x)/Feed(f)/Raff(r) | Nb1/Nb2/Nb3/Nb4 |
| At time dT1: | E1([e + 1]$_{Nc}$)/Ext(X)/Feed(f)/Raff(r) | Nb1 − 1/Nb2/Nb3/Nb4 + 1 |
| At time dT2: | E1([e + 1]$_{Nc}$)/Ext(X)/Feed(f)/Raff([r + 1]$_{Nc}$) | Nb1 − 1/Nb2/Nb3 + 1/Nb4 |
| At time dT3: | E1([e + 1]$_{Nc}$)/Ext(x)/Feed([f + 1]$_{Nc}$)/Raff([r + 1]$_{Nc}$) | Nb1 − 1/Nb2 + 1/Nb3/Nb4 |

TABLE 2-continued

| Inlet/Outlet | | No. of Columns in Each Zone |
|---|---|---|
| At time ΔT: | E1([e + 1]$_{Nc}$)/Ext([x + 1]$_{Nc}$)/ Feed([f + 1]$_{Nc}$)/ Raff([r + 1]$_{Nc}$) | Nb1/Nb2/Nb3/Nb4 |
| At time ΔT + dT1: | E1([e + 2]$_{Nc}$)/Ext([x + 1]$_{Nc}$)/ Feed([+ 1]$_{Nc}$)/Raff([r + 1]$_{Nc}$) | Nb1 − 1/Nb2/Nb3/Nb4 + 1 |
| At time ΔT + dT2: | E1([e + 2]$_{Nc}$)/Ext([x + 1]$_{Nc}$)/ Feed([+ 1]$_{Nc}$)/Raff([r + 2]$_{Nc}$) | Nb1 − 1/Nb2/Nb3 + 1/Nb4 |
| At time ΔT + dT3: | E1([e + 2]$_{Nc}$)/Ext([x + 1]$_{Nc}$)/ Feed([f + 2]$_{Nc}$)/ Raff([r + 2]$_{Nc}$) | Nb1 − 1/Nb2 + 1/Nb3/Nb4 |
| At time 2 × ΔT: | E1([e + 2]$_{Nc}$)/Ext([x + 2]$_{Nc}$)/ Feed ([f + 2]$_{Nc}$)/ Raff([r + 2]$_{Nc}$) | Nb1/Nb2/Nb3/Nb4 |

According to a second implementation that is illustrated by Table 3, the increase in length of a zone can be compensated for by a reduction of the opposite zone.

TABLE 3

| Inlet/Outlet | | No. of Columns in Each Zone |
|---|---|---|
| At time 0: | E1(e)/Ext(x)/Feed(f)/Raff(r) | Nb1/Nb2/Nb3/Nb4 |
| At time dT1: | E1([e + 1]$_{Nc}$)/Ext(x)/Feed(f)/ Raff([r + 1]$_{Nc}$) | Nb1 − 1/Nb2/Nb3 + 1/Nb4 |
| At time ΔT: | E1([e + 1]$_{Nc}$)/Ext([x + 1]$_{Nc}$)/ Feed([f + 1]$_{Nc}$)/ Raff([r + 1]$_{Nc}$) | Nb1/Nb2/Nb3/Nb4 |
| At time ΔT + dT1: | E1([e + 2]$_{Nc}$)/Ext([x + 1/ Feed(f + 1)/Raff([r + 2]$_{Nc}$) | Nb1 − 1/Nb2/Nb3 + 1/Nb4 |
| At time 2 × ΔT: | E1([e + 2]$_{Nc}$)/Ext([x + 2]$_{Nc}$)/ Feed([f + 2]$_{Nc}$)/ Raff([r + 2]$_{Nc}$) | Nb1/Nb2/Nb3/Nb4 |

Several other embodiments are possible, whereby some of them are shown in the examples.

It is possible, according to an advantageous embodiment, to shift at time ti by one column or column section the position of the draw-off point of the extract and the position of the draw-off point of the raffinate, then it is possible to shift at time t2 by one column or column section during said period the position of the feedstock injection point and position of the eluant injection.

According to a characteristic of the process, it is possible during the period to perform all of the shiftings of the injection or draw-off positions with an approximately constant time phase shift and advantageously with a time phase shift that is at least equal to a quarter-period.

According to a variant, it is possible to carry out during the period the shiftings of the positions of the injection or draw-off points with a non-constant time phase shift.

According to another characteristic, the flow rate of fluid that circulates in a given zone is generally kept approximately constant.

It is advantageous to carry out the shiftings of the positions of the injection points and draw-off points in the same direction as that of the flow in the columns or column sections.

According to another advantageous characteristic of the process, at least one flow rate of fluid that circulates in an injection or draw-off line can be monitored by the pressure in the device. Preferably, it is the flow rate of the raffinate and/or the extract, whereby the other fluids are then under flow rate monitoring.

It is advantageously possible to use a liquid as an eluant, but it is also possible to operate with a supercritical fluid or with a subcritical fluid.

The range of pressures in which the separations of products are carried out can be between 0.1 and 50 MPa and preferably between 0.5 and 30 MPa. The temperature in the columns is generally between 0° C. and 100° C. It was observed that the process according to the invention provided excellent results when the number of columns or column sections was less than 8. For values of greater than 8, it is very advantageous to optimize the process by studying the influence of the number and the lengths of the columns in each zone that is combined at the moment of shifting during the period of the cycle.

According to another embodiment, it is possible that the number of columns or column sections is temporarily zero in one or more zones of the system. It is then possible to work with at least two columns or column sections and advantageously with three.

The invention also relates to the device particularly for the implementation of the process.

More specifically, said device comprises a number of chromatographic columns or a chromatographic column section that contains an adsorbent, arranged in series and in a closed loop, whereby said loop comprises a number of fluid injection lines in each column or column section that are connected to at least one injection pump and a number of fluid draw-off lines of each column or column section that are connected to at least one draw-off means, at least one valve on each line, whereby said loop defines at least three chromatographic zones, whereby each of them is determined by a fluid injection point and a fluid draw-off point, whereby the device is characterized in that it comprises means for controlling the variation in time of the lengths of the zones that are connected to said valve and that are suitable for shifting by one column or column section the positions of the injection points and draw-off points in an intermittent manner.

When the loop is closed, it can comprise at least one pump for recirculating a fluid or at least one compressor of a supercritical solvent, a subcritical fluid or a compressed gas. When the loop is open, the eluant injection pump is connected to the outlet of zone IV and to the inlet of the following zone I to deliver, with makeup eluant, the required flow rate to the inlet of said zone I.

The valves that are used are advantageously all-or-none valves.

The draw-off means at the extract and raffinate lines can be a pump. It can also be an analog valve that is slaved to a flowmeter or to a means for measuring the pressure in the device, whereby the pressure in the system actually makes it possible to have the driving force for the flow.

The process according to the invention (VARICOL) is better explained in the examples below, but its differences compared to the process of the simulated moving bed will be noted immediately:

1. The zone lengths are not constant over time,
2. The number of columns per zone is not constant during the period,
3. The inlet/outlet lines are not moved simultaneously.

Although oscillation introduces a disturbance in the system, it seems, surprisingly enough, that the performance levels of the VARICOL process are often better than those of the simulated moving bed system (see Examples).

During a period, the number of columns in each zone has been varied, and for teaching purposes, it may be useful to define a mean number of columns per zone:

<Nb1>= mean number of columns contained in zone 1 during a period

<Nb2>= mean number of columns contained in zone 2 during a period

<Nb3> = mean number of columns contained in zone 3 during a period

<Nb4> = mean number of columns contained in zone 4 during a period.

Just as a simulated moving bed system can be presented by:

LMS Nb1/Nb2/Nb3/Nb4 we can represent a VARICOL periodic process by:

VARICOL <Nb1>/<Nb2>/<Nb3>/<Nb4>

Whereas the number of columns per zone has a real meaning for the LMS systems, however, the mean numbers which are not integers and which have no technical meaning are used simply for convenience for the VARICOL process.

For a given total column number, there are infinite possible configurations with the VARICOL process depending on the phase shift of the switchings that are carried out.

According to a particular type of configuration, the case where the mean column number in a zone can be less than 1 is proposed. This case is obtained if the number of columns in the zone is temporarily zero during the period, because of the asynchronous shifting of the injection points and draw-off points.

Let us consider, for example, a system that consists of 4 chromatographic columns. The only possible configuration in a simulated moving bed is the configuration that has a column in each of the four zones of the system.

With the 4-column VARICOL process, the number of possible configurations is infinite. It is actually possible to distribute the four columns between the zones thanks to asynchronous shifting of the inlet-outlet lines.

It is possible to obtain a distribution of the type <0.5><1.5><1.5><0.5> by following, for example, the switching time that is described in Table 4.

TABLE 4

| | Inlet/Outlet | No. of Columns in Each Zone |
|---|---|---|
| At time 0: | E1(1)/Ext(2)/Feed(3)/Raff(1) | 1 1 2 0 |
| At time ΔT/2: | E1(2)/Ext(2)/Feed(4)/Raff (1) | 0 2 1 1 |
| At time ΔT: | E1(2)/Ext(3)/Feed(4)/Raff(2) | 1 1 2 0 |
| At time ΔT + ΔT/2: | E1(3)/Ext(3)/Feed(1)/Raff(2) | 0 2 1 1 |
| At time 2 ΔT: | E1(3)/Ext(4)/Feed(1)/Raff(3) | 1 1 2 0 |

It is also possible to obtain a configuration of the type <0.5><1.5><0><1.5> by monitoring, for example, the switching time that is described in Table 5.

TABLE 5

| | Inlet/Outlet | No. of Columns in Each Zone |
|---|---|---|
| At time 0: | E1(1)/Ext(1)/Feed(3)/Raff(3) | 0/2/0/2 |
| At time ΔT/2: | E1(1)/Ext(2)/Feed(3)/Raff (4) | 1 1 1 1 |
| At time ΔT: | E1(2)/Ext(2)/Feed(4)/Raff(4) | 0 2 0 2 |
| At time ΔT + ΔT/2: | E1(2)/Ext(3)/Feed(4)/Raff(1) | 1 1 1 1 |
| At time 2 ΔT: | E1(3)/Ext(3)/Feed(1)/Raff(1) | 0/2/0/2 |

In this case, it can be noted that the feedstock is temporarily injected at the collecting point of the raffinate. The feedstock and raffinate lines are therefore simultaneously connected between two given columns of the system; there is therefore a danger of directly contaminating the raffinate that is sampled by the feedstock that is injected.

In the case of Table 4, the injection point of the eluant is temporarily located at the sampling point of the raffinate and the extract. There is therefore a danger that the injected eluant may move on to the draw-off points.

This can be solved, however, by a judicious adjustment of the injection points and draw-off points between the columns of the system. At the inlet of each of the columns, the extract and raffinate draw-off points precede the feedstock and eluant injection points, which thus prevents the draw-offs from being contaminated by the injection lines in the case where these lines would be temporarily positioned at the same point of the recycling circuit.

EXAMPLES

Example 1

This VARICOL process has been used to achieve the separation of stereoisomers of phytol (3,7,1,15-tetramethyl-2-hexadecen-1-ol, $C_{20}H_{40}O$). The synthetic phytol is a mixture of cis and trans isomers, whereby the latter is used in perfumery.

The separation between the isomers of phytol is accomplished on silica (Lichroprep Si 60, 25–40 micrometers of Merck KGaA, Darmstadt) with an eluant that consists of heptane-ethyl acetate (75/25 v/v) at 27° C. For the sake of simplicity, a solution that contains 50% of cis isomer and 50% of trans isomer is prepared. According to measurements that are made on the laboratory scale, the adsorption isotherms were determined and adjusted suitably on an equation model of the modified Langmuir type:

$$n_i = \lambda_i c_i + \frac{\vec{K}_i c_i}{1 + \sum_j \tilde{K}_j c_j}$$

whereby n is the concentration of space i that is adsorbed on the solid, $\lambda_1, \lambda_2, K_1, K_2, K_1$ and $K_2$ are adjustable parameters, whereby $C_i$ and $C_j$ are the concentrations of radicals i and j in the mobile phase.

With:
$\lambda_1 = 1.7$  $\lambda_2 = 1.7$
$K_1 = 0.20633$  $K_2 = 0.9862$
$K_1 = 0.00645$  $K_2 = 0.0308$ Knowledge of the adsorption isotherms is not absolutely necessary to carry out the VARICOL process, but it helps to find the operating parameters that are suitable for obtaining suitable purities. The techniques that are used rely on numerical simulation methods that are described in, for example, "Fundamentals of Preparative and Non-Linear Chromatography, G. Guiochon, S. Golsbran Shirazi and A. M. Katti, Academie Press, 1994."

The shiftings of the injection point or of the fluid draw-off point are done in time t, which is a fraction of the period ΔT.

1. 5-Column VARICOL System:

Experience has shown that for a feedstock concentration of 6.4 g/l, a suitable set of flow rates in a system that comprises 5 columns with a 2.6 cm diameter and a 16 cm length corresponds to $Q_{eluant} = 24.98$ ml/min  $Q_{feedstock} = 22.08$ ml/min $Q_{extract} = 25.42$ ml/min  $Q_{zone\ 1} = 106.84$ ml/min For this set of flow rates, the optimum movement period of the inlet/outlet positions is: ΔT = 1.6 minute for the simulated moving bed system (LMS).

The concentrations and purities of the extract and of the raffinate that are obtained by the various processes are given in Table 4. An overall purity is defined by the mean value of the purities of the extract and the raffinate.

TABLE 6

|  | Configuration | Extrait | | | Raffinat | | | pureté |
|---|---|---|---|---|---|---|---|---|
|  |  | cis (g/L) | trans (g/L) | pureté % | cis (g/L) | trans (g/L) | pureté % | globale |
| VARICOL | 1.25 1.25 1.25 1.25 | 0.170 | 2.690 | 94.1 | 3.060 | 0.120 | 96.2 | 95.2 |
|  | à t = 0     2111 |  |  |  |  |  |  |  |
|  | à t = ΔT/4  1112 |  |  |  |  |  |  |  |
|  | à t = ΔT/2  1121 |  |  |  |  |  |  |  |
|  | à t = 3ΔT/4 1211 |  |  |  |  |  |  |  |
| LMS | 1112 | 0.180 | 2.560 | 93.4 | 3.050 | 0.260 | 92.1 | 92.8 |
| LMS | 1121 | 0.280 | 2.670 | 90.5 | 2.940 | 0.120 | 96.1 | 93.3 |
| LMS | 1211 | 0.180 | 2.500 | 93.3 | 3.050 | 0.260 | 92.1 | 92.7 |
| LMS | 2111 | 0.280 | 2.640 | 90.4 | 2.940 | 0.170 | 94.5 | 92.5 |
| VARICOL | 1.2 1.2 1.4 1.2 | 0.185 | 2.694 | 93.6 | 3.050 | 0.108 | 96.6 | 95.1 |
|  | à t = 0     1112 |  |  |  |  |  |  |  |
|  | à t = ΔT/5  1121 |  |  |  |  |  |  |  |
|  | à t = 3ΔT/5 1211 |  |  |  |  |  |  |  |
|  | à t = 4ΔT/5 2111 |  |  |  |  |  |  |  |

Key to Table 6:
Extrait = Extract
pureté = purity
Raffinat = raffinate
pureté globale = overall purity
à t = . . . = at t = . . .

[Key to Table 6:]
Extrait=Extract
pureté=purity
Raffinat=raffinate
pureté globale=overall purity
à t=. . . =at t=. . .

All of the possible configurations of the simulated moving bed (for a 5-column system) are present in Table 6. The best mean purity (93.3%) is obtained by the configuration 1/1/2/1.

The 4-zone VARICOL process with a 1.25 column on average makes it possible to obtain a mean purity of 95.2%, which is therefore about 2% greater than the best result that is obtained with the LMS process. Let us emphasize that this ability of the VARICOL process to obtain higher purities with columns and flow rates that are similar to those of the LMS is extremely advantageous.

The second implementation of the VARICOL process makes it possible to illustrate an operation for which the time phase shift from line to line is not identical and which also shows good results.

2. 8-Column Systems

To keep the length of the column and the amount of stationary phase constant in the system, the length of each of the columns was reduced to 10 cm. The same flow rates as those in the 5-column system were used by adjusting the period to ΔT=1 minute.

The concentrations and purities that are obtained in the flow of the extract and raffinate for the various processes are presented in Table 7. An overall purity is defined as the mean value of the purities of the extract and the raffinate.

TABLE 7

|  | Configuration | Extrait | | | Raffinat | | | pureté |
|---|---|---|---|---|---|---|---|---|
|  |  | cis (g/L) | trans (g/L) | pureté % | cis (g/L) | trans (g/L) | pureté % | globale |
| VARICOL 1 | 1.5 2.5 1.5 2.5 | 0.080 | 2.680 | 97.1 | 3.170 | 0.130 | 96.1 | 96.6 |
|  | à t = 0     1313 |  |  |  |  |  |  |  |
|  | à t = ΔT/2  2222 |  |  |  |  |  |  |  |
| VARICOL 2 | 2.5 2.5 1.5 1.5 | 0.130 | 2.720 | 95.4 | 3.110 | 0.090 | 97.2 | 96.3 |
|  | à t = 0     2312 |  |  |  |  |  |  |  |
|  | à t = ΔT/2  3221 |  |  |  |  |  |  |  |
| VARICOL 3 | 1.5 1.5 2.5 2.5 | 0.180 | 2.770 | 93.9 | 3.060 | 0.030 | 99.0 | 96.5 |
|  | à t = 0     1223 |  |  |  |  |  |  |  |
|  | à t = ΔT/2  2132 |  |  |  |  |  |  |  |
| LMS | 2222 | 0.110 | 2.720 | 96.100 | 3.140 | 0.070 | 97.8 | 97.0 |

Key to Table 7:
Extrait = Extract
pureté = purity
Raffinat = raffinate
pureté globale = overall purity
à t = . . . = at t = . . .

[Key to Table 7:]
Extrait=extract
pureté=purity
Raffinat=raffinate
pureté globale=overall purity
à t=. . . =at t=. . .

In this case, the purities of LMS are already high (about 97%), and it was not possible to improve on these results with VARICOL process. The way to obtain higher purities would be to increase the column lengths and/or to increase the number of columns within the framework of the process according to the invention and/or to change the flow rates that are used.

Example 2

The separation between fructose and glucose was studied in a Dowex 99 monosphere (350 micrometers) in the form of calcium that uses water (65° C.) as an eluant. Under these conditions, the adsorption isotherms are nearly linear, and the retention factors of the two sugars are provided by:

$K_{glucose}=0.25$  $K_{fructose}=0.45$.

1. 5-Column Systems:

Experience has shown that for a feedstock concentration of 50 g/l of each radical, a suitable set of flow rates for a system that consists of columns with a 2.6 cm diameter and a 160 cm length is:

$Q_{eluennt}=18.13$ ml/min  $Q_{feedstock}=13.76$ ml/min
$Q_{extract}=16.57$ ml/min  $Q_{zone\ 1}=90.36$ ml/min For this set of flow rates, the optimum displacement period of the position of inlets/outlets is: $\Delta T = 6.4$ minutes for the simulated moving bed (LMS).

[Key to Table 8:]

Extrait=extract pureté=purity

Raffinat=raffinate pureté globale=overall purity

à t=. . . =at t=

The improvement that is obtained thanks to the 4-zone VARICOL process with a 1.25 column (Table 8) is also very significant here. The overall purity is nearly 3% greater than that obtained in the case of a standard LMS.

2. Systems with 6, 7, and 8 Columns

Other experiments were carried out and are presented in Tables 9, 10 and 11.

The total column lengths and the flow rates were kept constant in the two types of tests for the same system. For each case, the period and the lengths of the columns were adjusted.

6-Column System: L=1.33 m, $\Delta T=5.32$ minutes

TABLE 8

| | Configuration | Extrait Glucose (g/l) | Extrait Fructose (g/l) | Extrait pureté % | Raffinat Glucose (g/l) | Raffinat Fructose (g/l) | Raffinat pureté % | pureté globale |
|---|---|---|---|---|---|---|---|---|
| VARICOL | 1.25 1.25 1.25 1.25 | 2.710 | 39.380 | 93.6 | 41.890 | 2.450 | 94.5 | 94.1 |
| | à t = 0          1112 | | | | | | | |
| | à t = ΔT/4      1121 | | | | | | | |
| | à t = ΔT/2      1211 | | | | | | | |
| | à t = 3ΔT/4    2111 | | | | | | | |
| LMS | 1112 | 2.860 | 37.010 | 92.8 | 41.820 | 4.870 | 89.6 | 92.2 |
| LMS | 1121 | 4.500 | 39.190 | 89.7 | 40.040 | 2.500 | 94.1 | 91.9 |
| LMS | 1211 | 2.540 | 37.010 | 89.7 | 42.130 | 4.870 | 89.6 | 89.7 |
| LMS | 2111 | 4.500 | 38.660 | 89.7 | 40.040 | 3.090 | 92.8 | 91.3 |

Key to Table 8:
Extrait = Extract
pureté = purity
Raffinat = raffinate
pureté globale = overall purity
à t = . . . = at t = . . .

TABLE 9

| Type | Configuration | Extrait Glucose (g/l) | Extrait Fructose (g/l) | Extrait pureté % | Raffinat Glucose (g/l) | Raffinat Fructose (g/l) | Raffinat pureté % | pureté globale % |
|---|---|---|---|---|---|---|---|---|
| VARICOL | 1.5 1.5 1.5 1.5 | 2.11 | 39.94 | 95.0 | 42.50 | 1.88 | 95.8 | 95.4 |
| | à t = 0          1212 | | | | | | | |
| | à t = ΔT/2      2121 | | | | | | | |
| LMS | 1122 | 3.29 | 38.73 | 92.2 | 41.35 | 3.00 | 93.2 | 92.7 |
| LMS | 1212 | 1.02 | 36.37 | 97.3 | 43.79 | 5.56 | 88.7 | 93.0 |
| LMS | 2112 | 3.29 | 38.19 | 92.1 | 41.35 | 3.59 | 92.0 | 92.0 |
| LMS | 1221 | 2.97 | 38.73 | 92.9 | 41.67 | 3.00 | 93.3 | 93.1 |
| LMS | 2121 | 5.05 | 40.78 | 89.0 | 39.44 | 0.78 | 98.1 | 93.5 |
| LMS | 2211 | 2.97 | 38.19 | 92.8 | 41.67 | 3.59 | 92.1 | 92.4 |

Key to Table 9:
Extrait = Extract
pureté = purity
Raffinat = raffinate
pureté globale = overall purity
à t = . . . = at t = . . .

[Key to Table 9:]
  Extrait=extract
  pureté=purity
  Raffinat=raffinate
  pureté globale=overall purity
  à t=... =at t=...
  7-Column System: L=1.14 m, ΔT=4.56 minutes

[Key to Table 10:]
  Extrait=extract
  pureté=purity
  Raffinat=raffinate
  pureté globale=overall purity
  à t=... =at t=...
  8-Column System: L=1 m, ΔT=4 minutes

TABLE 10

|  | Configuration | | Extrait | | | Raffinat | | | pureté |
|---|---|---|---|---|---|---|---|---|---|
|  |  |  | Glucose (g/l) | Fructose (g/l) | pureté % | Glucose (g/l) | Fructose (g/l) | pureté % | globale % |
| VARICOL | 1.75 1.75 1.75 1.75 | | 1.81 | 40.24 | 95.7 | 42.83 | 1.54 | 96.5 | 96.1 |
|  | à t = 0 | 1222 | | | | | | | |
|  | à t = ΔT/4 | 2122 | | | | | | | |
|  | à t = ΔT/2 | 2212 | | | | | | | |
|  | à t = 3ΔT/4 | 2221 | | | | | | | |
| LMS | | 1222 | 1.3 | 38.30 | 96.7 | 43.49 | 3.47 | 92.6 | 94.7 |
| LMS | | 2122 | 3.68 | 40.52 | 91.7 | 40.93 | 1.07 | 97.5 | 94.6 |
| LMS | | 2212 | 1.3 | 37.76 | 96.7 | 43.49 | 4.07 | 91.4 | 94.1 |
| LMS | | 2221 | 3.36 | 40.52 | 92.3 | 41.25 | 1.07 | 97.5 | 94.9 |

Key to Table 10:
Extrait = Extract
pureté = purity
Raffinat = raffinate
pureté globale = overall purity
a t = . . . = at t = . . .

TABLE 11

|  | Configuration | | Extrait | | | Raffinat | | | pureté |
|---|---|---|---|---|---|---|---|---|---|
|  |  |  | Glucose (g/l) | Fructose (g/l) | pureté % | Glucose (g/l) | Fructose (g/l) | pureté % | globale % |
| LMS | | 2222 | 1.62 | 40.20 | 96.1 | 43.15 | 1.41 | 96.8 | 96.5 |
| VARICOL | 1.75 1.75 2.25 2.25 | | 1.79 | 40.27 | 95.7 | 42.93 | 1.44 | 96.8 | 96.2 |
|  | à t = 0 | 2132 | | | | | | | |
|  | à t = ΔT/4 | 2222 | | | | | | | |
|  | à t = 3ΔT/4 | 1223 | | | | | | | |
| VARICOL | 1.75 2.25 1.75 2.25 | | 1.26 | 39.73 | 96.9 | 43.49 | 1.99 | 95.6 | 96.3 |
|  | à t = 0 | 2222 | | | | | | | |
|  | à t = 3ΔT/4 | 1313 | | | | | | | |
| VARICOL | 1.75 2.25 2.25 1.75 | | 1.67 | 40.33 | 96.0 | 42.69 | 1.42 | 96.8 | 96.4 |
|  | à t = 0 | 1322 | | | | | | | |
|  | à t = ΔT/4 | 2222 | | | | | | | |
|  | à t = 3ΔT/4 | 2231 | | | | | | | |
| VARICOL | 2.25 1.75 2.25 1.75 | | 2.17 | 40.72 | 94.9 | 42.46 | 1.00 | 97.7 | 96.3 |
|  | à t = 0 | 2222 | | | | | | | |
|  | à t = 3ΔT/4 | 3131 | | | | | | | |
| VARICOL | 2.25 1.75 1.75 2.25 | | 1.74 | 40.09 | 95.8 | 42.94 | 1.55 | 96.5 | 96.2 |
|  | à t = 0 | 2213 | | | | | | | |
|  | à t = ΔT/4 | 2222 | | | | | | | |
|  | à t = 3ΔT/4 | 3122 | | | | | | | |
| VARICOL | 2.25 2.25 1.75 1.75 | | 1.7 | 40.24 | 95.9 | 42.91 | 1.52 | 96.6 | 596.3 |
|  | à t = 0 | 3221 | | | | | | | |
|  | à t = ΔT/4 | 2222 | | | | | | | |
|  | à t = 3ΔT/4 | 2312 | | | | | | | |

Key to Table 11:
Extrait = Extract
pureté = purity
Raffinat = raffinate
pureté globale = overall purity
a t = . . . = at t = . . .

[Key to Table 11:]
  Extrait=extract
  pureté=purity
  Raffinat=raffinate
  pureté globale=overall purity
  à t=. . . =at t=. . .

The analysis of the results that are presented in Tables 8, 9, 10 and 11 leads to the following conclusions:

A 5-column VARICOL system is more efficient than all of the possible LMS 5 columns
  A 6-column VARICOL system is more efficient than all of the possible LMS 6 columns,
  A 7-column VARICOL system is more efficient than all of the possible LMS 7 columns,
  A 5-column VARICOL system makes it possible to attain purities that are equivalent to that which is obtained with an LMS with 6 columns. The VARICOL process therefore makes possible a significant reduction in cost,
  The VARICOL process is more advantageous for a system whose number of columns is less than 8.

The fact of being able to have a column number that is temporarily zero in the zones can make it possible to use four-zone VARICOL configurations by using a total column number that is less than the number of zones. A VARICOL configuration with 3 columns is illustrated in this example.

Example 3

The VARICOL process has been used to carry out the separation of the racemic mixture of 1,2,3,4-tetrahydro-1naphthol. The separation is carried out on a chiral stationary phase (Chiralpak AD 20 $\mu$m, Daicel, Japan) with an eluant that consists of heptane-isopropanol-trifluoroacetic acid (95/5/0.2 v/v/v) at 27° C.

3-Column VARICOL System

The four-zone simulated moving bed cannot be produced with 3 columns. The four-zone VARICOL process, however, can be carried out by using a column number that is temporarily zero in certain zones of the system.

The operating flow rates have been optimized for a feedstock concentration of 20 g/l in the VARICOL system that consists of 3 columns with a 1 cm diameter and a 20 cm length.

A VARICOL configuration of the type <0.5><1><1><0.5> is used to study the potentiality of this type of process. An example of valve switching that makes it possible to obtain this configuration is presented in Table 12.

TABLE 12

| | Inlet/Outlet | No. of Columns in Each Zone |
|---|---|---|
| At time 0: | E1(1)/Ext(2)/Feed(3)/Raff(1) | 1/1/1/0 |
| At time $\Delta$T/2: | E1(2)/Ext(2)/Feed(3)/Raff(1) | 0/1/1/1 |
| At time $\Delta$T: | E1(2)/Ext(3)/Feed(1)/Raff(2) | 1/1/1/0 |
| At time $\Delta$T + $\Delta$T/2: | E1(3)/Ext(3)/Feed(1)/Raff(2) | 0/1/1/1 |
| At time 2 $\Delta$T: | E1(3)/Ext(1)/Feed(2)/Raff(3) | 1/1/1/0 |

The operating flow rates are optimized (maximization of the productivity of the system) to obtain an extract and raffinate purity of 95%.

With a period $\Delta$T of 1.66 minutes, the following operating flow rates make it possible to reach the required purities:

$Q_{eluant}$=9.21 ml/min $Q_{feedstock}$=1.54 ml/min
$Q_{extract}$=7.32 ml/min $Q_{zone\ 1}$=29.04 ml/min It thus is shown that a four-zone VARICOL system makes it possible to purify a mixture with three columns by using a column number that is temporarily zero in zones 1 and 4.

4-Column VARICOL System:

The performances of a four-column (1/1/1) simulated moving bed (SMB) are compared with various configurations of four-column VARICOL.

For these two processes, four chromatographic columns with a 1 cm diameter and a 10 cm length are used.

A valve switching example that makes it possible to obtain a VARICOL <0.5><1.5><1.5><0.5> is presented in Table 13.

TABLE 13

| | Inlet/Outlet | No. of Columns in Each Zone |
|---|---|---|
| At time 0: | E1(1)/Ext(1)/Feed(3)/Raff(4) | 2/0/1/1 |
| At time $\Delta$T/2: | E1(1)/Ext(2)/Feed(3)/Raff(1) | 1/1/2/0 |
| At time $\Delta$T: | E1(2)/Ext(2)/Feed(4)/Raff(1) | 0/2/1/1 |
| At time $\Delta$T + $\Delta$T/2: | E1(2)/Ext(3)/Feed(4)/Raff(2) | 1/1/2/0 |
| At time 2 $\Delta$T: | E1(3)/Ext(3)/Feed(1)/Raff(2) | 0/2/1/1 |

Table 14 compares the operating flow rates of the optimized SMB and VARICOL systems to reach a purity of 95% with the extract and the raffinate. For the two systems, the period is equal to 0.83 minute.

TABLE 14

| | $Q_{zone\ 1}$ (ml/min) | $Q_{eluant}$ (ml/min) | $Q_{extract}$ (ml/min) | $Q_{feedstock}$ (ml/min) |
|---|---|---|---|---|
| SMB 1/1/1/1 | 27.10 | 5.79 | 4.76 | 1.13 |
| VARICOL <0.5><1.5><1.5><0.5> | 29.96 | 10.74 | 8.73 | 1.84 |

In this table, it is possible to compare the productivity of the different configurations that are studied by comparing the flow rate of injected mixture $Q_{feedstock}$ in the system.

It is possible to note that the different VARICOL configurations tested make it possible to significantly increase the productivity of the system (+63%) relative to a 4-column SMB process.

The entire disclosure of the parent application Ser. No. 09/208,765, filed Dec. 10, 1998, is incorporated by reference herein.

What is claimed is:

1. A non-simulated-moving-bed (non-SMB) process for separating at least one component of a mixture that contains it, comprising introducing said mixture into a non-SMB device that has a set of chromatographic columns or chromatographic column sections that contain an adsorbent and are arranged in series and in a closed loop, whereby the loop comprises at least one feedstock injection point, a raffinate draw-off point, an eluant injection point, and an extract draw-off point, in which a chromatographic zone is determined between an injection point and a draw-off point or vice-versa, and wherein at the end of a given period of time all of the injection and draw-off points are shifted by the same number of columns or column sections, and during said period, shifting different injection and draw-off points at different times such that the lengths of the zones that are defined by said different points are variable.

2. A non-SMB process according to claim 1, wherein the succession of the following stages is carried out at least once:

At moment t1 during said period, in a given direction, the position of the injection point or draw-off point is shifted relative to at least one zone by a column or column section, then at a moment t2 during said period, the position of the injection point or draw-off point that is relative to at least one other zone is shifted in the same direction by a column or column section, and the operation is repeated if necessary such that after said time period, the same column configuration or column section configuration as the initial configuration is regained with a shifting of all of the positions of the injection points and draw-off points of the same number of columns or column sections.

3. A non-SMB process according to claim 1, wherein the succession of the following stages is carried out at least once:

At moment t1 during said period, in a given direction, the position of the injection point or draw-off point is shifted relative to at least one zone by a column or column section, in such a way as to increase the length of said zone and to reduce the length of the zone that is adjacent to said zone, then at a moment t2 during said period, the position of an injection point or draw-off point that is relative to at least one other zone is shifted in the same direction by a column or column section, in such a way as to increase the length of said other zone and to reduce the length of the zone that is adjacent to said other zone, and the operation is repeated if necessary such that after said time period, the same column configuration or column section configuration as the initial configuration is regained with a shifting of all of the positions of the injection points and draw-off points of the same number of columns or column sections.

4. A non-SMB process according to claim 1, wherein at moment t1, the position of the extract draw-off point and the position of the raffinate draw-off point are shifted by a column or column section, then at a moment t2 during said period, the position of the feedstock injection point and the position of the eluant injection point are shifted by a column or column section.

5. A non-SMB process according to claim 1, wherein during the period, all of the shiftings of injection positions or draw-off positions are carried out with a time phase shift that is approximately constant and advantageously with a phase shift that is at least equal to one quarter-period.

6. A non-SMB process according to claim 1, wherein during the period, shiftings of the positions of the injection points or draw-off points are carried out with a non-constant time phase shift.

7. A non-SMB process according to claim 1, wherein the flow rate of fluid that circulates in a given zone is kept approximately constant.

8. A non-SMB process according to claim 1, wherein said shiftings are carried out in the same direction as that of the flow in the loop.

9. A non-SMB process according to claim 1, wherein at least one flow rate of fluid that circulates in an injection line or draw-off line is controlled by the pressure in the device, and preferably the flow rate of fluid that is drawn off as raffinate and/or extract.

10. A non-SMB process according to claim 1, wherein the eluant is a liquid, a supercritical or subcritical fluid, or a compressed gas.

11. A non-SMB process according to claim 1, wherein the number of columns is less than 8.

12. A non-SMB process according to claim 1, wherein the loop comprises four chromatographic zones.

13. A non-SMB process according to claim 1, wherein the number of columns is temporarily zero in one or more chromatographic zones.

14. A non-SMB process of claim 1 wherein at the end of said period all of the injection and draw-off points are shifted by one column or column section in a given direction that is defined relative to that of the flow of a main fluid that circulates through the loop.

* * * * *

UNITED STATES PATENT AND TRADEMARK OFFICE
CERTIFICATE OF CORRECTION

PATENT NO.   : 6,375,839 B1
DATED        : April 23, 2002
INVENTOR(S)  : Phillippe Adam et al.

It is certified that error appears in the above-identified patent and that said Letters Patent is hereby corrected as shown below:

Title page,
Item [63], Related U.S. Application Data, please delete "Division" and insert
-- Continuation-in-part --.

Column 1,
Line 5, delete "division" and insert -- continuation-in-part --.

Signed and Sealed this

Fourteenth Day of September, 2004

JON W. DUDAS
*Director of the United States Patent and Trademark Office*